United States Patent [19]

Lough

[11] Patent Number: 4,848,775
[45] Date of Patent: Jul. 18, 1989

[54] LIQUID SEAL FOR MARINE STERN DRIVE GEAR SHIFT SHAFTS

[76] Inventor: Steven G. Lough, 2916 Nodosa Dr., Sarasota, Fla. 34232

[21] Appl. No.: 203,014

[22] Filed: Jun. 6, 1988

[51] Int. Cl.$^4$ ............................................. F16J 15/00
[52] U.S. Cl. ....................................... 277/12; 277/153
[58] Field of Search ...................... 277/4, 58, 153, 181, 277/182, 192, 1, 212 FG, 3, 25, 105, 12; 114/144 R, 154, 155; 384/149

[56] References Cited

U.S. PATENT DOCUMENTS

| | | | |
|---|---|---|---|
| 1,617,952 | 2/1927 | Judd | 277/105 |
| 2,925,291 | 2/1960 | Bygbjerg | 277/105 |
| 3,687,464 | 8/1972 | Jackson et al. | 277/153 |
| 4,201,391 | 5/1980 | Bomkstahl | 277/212 FB |
| 4,563,940 | 1/1986 | Wuhrer | 277/58 |
| 4,640,305 | 2/1987 | Johnson | 277/105 |
| 4,659,868 | 4/1987 | Sala | 277/105 |
| 4,717,160 | 1/1988 | Zitting et al. | 277/105 |
| 4,737,087 | 4/1988 | Hertell | 277/58 |

Primary Examiner—William A. Cuchlinski, Jr.
Assistant Examiner—Jeff Hohenshell
Attorney, Agent, or Firm—Charles J. Prescott

[57] ABSTRACT

An improved liquid seal for a stern drive bell housing gear shift shaft. The upper end of the gear shift shaft is positioned within the designed water free drive shaft gimbal passageway in the bell housing while the majority of the remaining portion of the gear shift shaft extends through the adjacent exhaust passageway in the bell housing which is designed to have sea water passing therethrough. The seal is disposed within an aperture in the partition between the gimbal and exhaust passageways through and within which the gear shift shaft is held for operable rotation. The seal includes a rigid bushing having an upper and a lower portion, the upper portion adapted for forced watertight fit within the bell housing partition aperture. The lower portion of the seal is enlarged and adapted to sealably receive at least one replaceable enlarged annular-shaped water and oil seal which operably engages against the gear shift shaft.

4 Claims, 1 Drawing Sheet

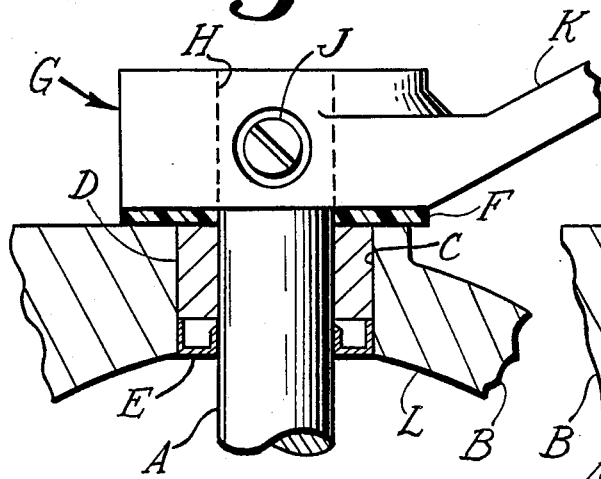
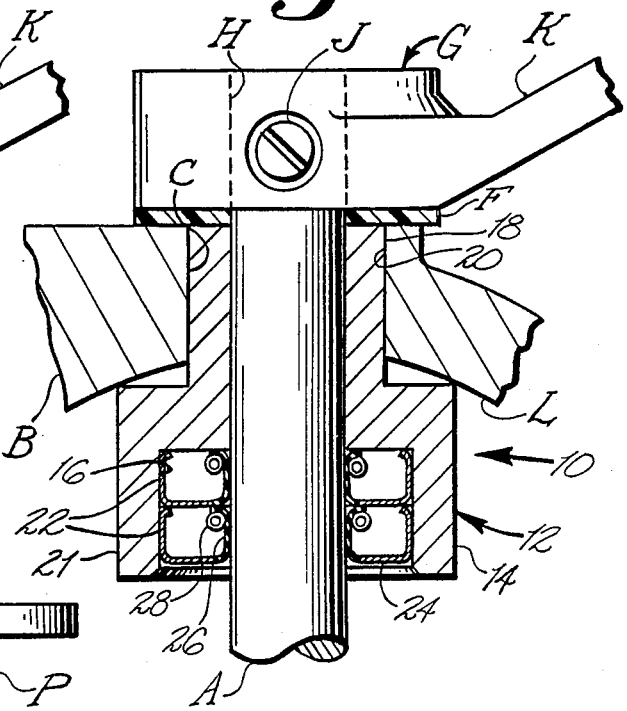
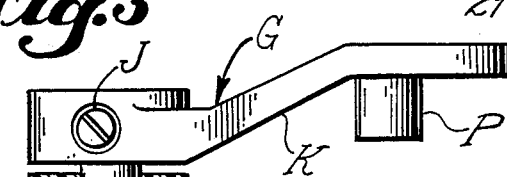
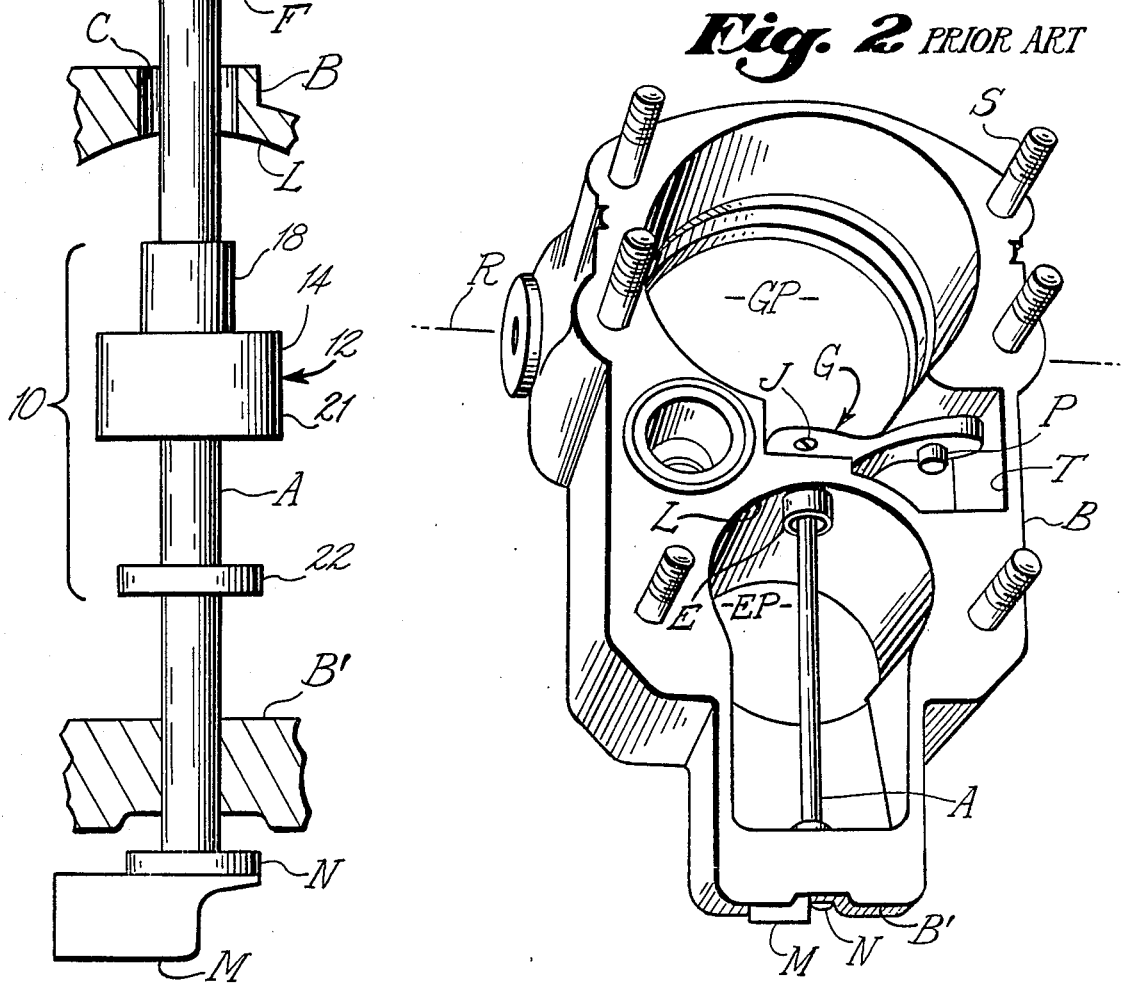

LIQUID SEAL FOR MARINE STERN DRIVE GEAR SHIFT SHAFTS

BACKGROUND OF THE INVENTION

This invention relates generally to marine cylindrical shaft liquid seals, and more particularly to a gear shift shaft liquid seal in a stern drive bell housing.

One of the major marine stern drive propulsion systems manufacturers distributing under the trademark Mercruiser has had an ongoing problem with a particular liquid seal around the gear shift shaft disposed within the bell housing of stern drive units. This bell housing is generally pivotally connected to the transom mounting plate of the stern drive unit and houses two parallel adjacent passageways. The upper passageway is provided to accommodate the drive train gimbal or universal, while the lower passageway is adapted to convey exhaust gasses and heated sea water from the engine. The gimbal passageway is designed to be watertight or water free, while the exhaust passageway is designed to have sea water passing therethrough.

A gear shift shaft is mounted vertically within the bell housing having its upper portion supportively mounted within a partition between and partially defining the gimbal and exhaust passageways and having its lower portion supportively mounted in an aperture at the bottom of the exhaust passageway. As a result, the main central portion of the gear shift shaft is exposed to both exhaust gasses and heated sea water.

Disposed at the upper end of the gear shift shaft is an elongated shift lever which laterally extends and is connectable at its distal end to a gear shift cable which itself extends to the throttle and gear shift levers at the helm of the boat. To prevent sea water entering the gimbal passageway past the gear shift shaft at the partition, the manufacturer now provides a cylindrical brass bushing for forceable insertion into the aperture in the dividing partition between gimbal and exhaust passageways. The cylindrical bushing includes a central hole therethrough for snug fitting around the gear shift shaft. This brass bushing is slightly thinner than the thickness of the dividing partition so as to accommodate a single rubber o-ring or oil seal below the bushing. One version of this oil seal incorporates an inner metal cup encapsulated by rubber on all surfaces to provide a liquid seal both against the gear shift shaft and the dividing partition aperture.

Although this conventional bushing/seal arrangement in its early stages of use is reasonably effective, eventually electrolysis and deterioration occurs between the seal and aperture in the partition and the seal fails. In such circumstances, the replacement with another identical seal is effective for only a short period of time, if at all. The deteriorated partition aperture is unable to effectively retain a new seal in place and resort is frequently made to bonding agents such as epoxies and the like to assist in retaining the replacement seal in place. However, this is only a one-time fix whereupon at the next seal failure, the entire bell housing must be replaced.

The net effect of deterioration of these conventional seals is that sea water enters into the gimbal passageway and into the shift cable connected to the shift lever. Thereafter, rapid deterioration between the casing and the core of the shift cable occurs resulting in binding and ultimate failure of the shift cable which must also then be replaced.

The present invention provides an improved liquid seal for this environment which is adaptable to both service and supplant both the brass bushing and the conventional seal and may also be incorporated into O.E.M. components at manufacture.

BRIEF SUMMARY OF THE INVENTION

This invention is directed to an improved liquid seal for a stern drive bell housing gear shift shaft. The upper end of the gear shift shaft is positioned within the designed water free drive shaft gimbal passageway in the bell housing while the majority of the remaining portion of the gear shift shaft extends through the adjacent exhaust passageway in the bell housing which is designed to have sea water passing therethrough. The seal is disposed within an aperture in the partition between the gimbal and exhaust passageways through and within which the gear shift shaft is held for operable rotation. The seal includes a rigid bushing having an upper and a lower portion, the upper portion adapted for forced watertight fit within the bell housing partition aperture. The lower portion of the seal is enlarged and adapted to sealably receive at least one replaceable enlarged annular-shaped water and oil seal which operably engages against the gear shift shaft.

It is therefore an object of this invention to provide an improved liquid seal around the gear shift shaft mounted within a marine stern drive bell housing.

It is another object of this invention to provide an improved liquid seal around the gear shift shaft mounted within a marine stern drive bell housing which may be utilized to service after market repairs.

It is yet another object of this invention to provide a liquid seal around the gear shift shaft mounted within a marine stern drive bell housing which may be incorporated into O.E.M. installations.

It is yet another object to provide the above invention which is readily reserviceable, if and when required, without concern for further deterioration of the aperture in the bell housing into which this invention is to be installed.

In accordance with these and other objects which will become apparent hereinafter, the instant invention will now be described with reference to the accompanying drawings in which:

BRIEF DESCRIPTION OF THE DRAWINGS

FIG. 1 is a side elevation view partially in section of the prior art seal design showing the relationship between gear shift shaft, shift lever, bell housing and conventional seal between bell housing and gear shift shaft.

FIG. 2 is a broader perspective view of the entire bell housing and prior art arrangement.

FIG. 3 is a side elevation view of the present invention in exploded form mounted around the gear shift shaft and within the bell housing.

FIG. 4 is an enlarged side elevation partial section view of the upper portion of the invention as shown in FIG. 3.

DETAILED DESCRIPTION OF THE INVENTION

Prior Art

Referring now to the drawings, and particularly to FIGS. 1 and 2, the prior art environment into which the present invention is to be disposed is there shown. Marine stern drive units marketed under the trademark Mercruiser include a bell housing B which is adapted to be pivotally mounted along axis R to a transom plate which is rigidly connected to the transom of a boat. The bell housing B includes a drive shaft gimbal passageway GP and an adjacent parallel exhaust passageway EP disposed therebelow. These two passageways GP and EP are separated by partition L which is solid and otherwise watertight therebetween except for aperture C which is disposed therethrough as best seen in FIG. 1.

Disposed within aperture C in partition L is the upper end of gear shift shaft A mounted therein for support and rotation as well as at its lower end in a similar aperture disposed in the bottom portion B' of bell housing B. This gear shift shaft A includes a laterally extending shift lever G having aperture H for receiving same and which is held by set screw J onto the upper end of shift shaft A. This shift lever G includes bushing P which is interconnectable to the lower end of a gear shift cable (not shown) which extends through the boat to its upper end and which is interconnected to the user controls for throttle and gear selection. It is this environment within cavity T including the shift lever G and the lower end of the shift cable (not shown) which must be kept watertight. Of interest, the lower end of the gear shift shaft A includes collar N having bracket M connected thereto for interengagement to the lower unit gearing.

To accomplish this watertightness, the manufacturer provides a brass bushing D which is forceably urged into aperture C and having a central hole disposed therethrough for snuggly receiving the gear shift shaft A. The brass bushing D is designed to be somewhat thinner than the thickness of partition L so that a liquid seal E may be tightly disposed within aperture C therebelow and in watertight contact with gear shift shaft A. Nylon washer F is also provided to reduce friction between shift lever G and the top surface of partition L as shown in FIG. 1.

Once deterioration of seal E begins to occur and sea water begins to enter into gimbal housing GP and cavity T, rapid deterioration of aperture C adjacent the seal E begins to occur and, in addition to sea water leaking between gear shift shaft A and seal E, sea water also begins to pass between seal E and aperture C. In many cases, because of the deterioration, particularly by electrolysis, of partition L, a simple replacement of seal E is not practical unless additional permanent bonding material such as Marinetex is utilized to retain the new seal E.

THE INVENTION

Referring now to FIGS. 3 and 4, the preferred embodiment of the invention is shown generally at numeral 10 and includes a bushing 12 fabricated of machined brass and having an enlarged lower portion 14 and a smaller upper portion 18. Upper portion 18 has an outside cylindrical surface adapted to be forceably and sealably urged into existing aperture C even if somewhat deteriorated. Upper portion 18 is also provided with an elongated cylindrical aperture 20 which extends into lower portion 14 and which is adapted to slidably and rotatably receive gear shift shaft A as shown.

Lower portion 14 includes an enlarged outer cylindrical surface 21 chosen of any convenient size and diameter. However, the inner cylindrical aperture 16 is adapted to forceably and sealably receive the outer diameter of annular seal 22. The preferred seal 22 is one that is commercially available from Chicago Rawhide (C.R. Industries) under their part number 3719. This seal includes a thin metal outer shell 24 which is bonded to an inner elastomeric sleeve 26 which sealably presses against gear shift shaft A. To enhance sealability, a continuous tensioned annular spring 28 is provided with this seal to increase its water sealability against the gear shift shaft A.

In the preferred embodiment, cavity 16 is provided of sufficient depth to forceably receive two of these seals 22 in stacked coaxial arrangement to further enhance and insure the watertightness of gimbal passageway GP.

It should be noted that, for convenience of machining, the transition between the outer surface of lower portion 14 and that of upper portion 18 is chosen to be a right angle shoulder configuration. This results in a misalignment of the top surface of partition L and the shoulder on the bushing 10 created by this sharp transition. Although the structure does allow for the free flow of water and cleaning of debris from these otherwise mating surfaces, the original equipment O.E.M. version or embodiment of this invention may include a longitudinal cylindrical surface which would mate with the lower surface of partition L at this point to provide exact mating alignment between these surfaces.

Typically on repair of conventionally sealed units, no deterioration or electrolysis has been noted between straight bushing D as best seen in FIG. 1 and the adjacent aperture C, and it has also been, through limited experimentation, determined that, likewise no deterioration or electrolysis occurs between aperture C and the outer surface of upper portion 18 of the invention 10. Therefore, if and when seals 22 must be replaced, the trained mechanic may either remove these seals with bushing 10 remaining in place, or temporarily remove the bushing to replace seals 22 and then reinstall the entire bushing 10 and new seals 22 into aperture C.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A liquid seal structured to provide a watertight barrier between adjacent the upper end of an elongated gear shift shaft in a marine stern drive system and an aperture in the stern drive bell housing, the aperture located between the exhaust passageway and the parallel adjacent gimbal passageway of the bell housing, the aperture for receiving the upper end of the gear shift shaft installed therethrough, said liquid seal comprising:

a rigid bushing having coaxial upper and lower portions;
   said upper portion having a first outer surface structured to be sealably urged into the bell housing aperture to form a watertight junction therebetween and thusly positioning said lower portion against the top surface of the exhaust passageway;
   said upper portion also having a longitudinal shift shaft aperture generally concentric with and extending along the length of said upper portion structured to supportively receive the upper end of the gear shift shaft for supportive rotation therein;

said lower portion having a second outer surface radially larger than said first outer surface and positioned in the exhaust passageway and a generally concentric seal cavity continuous with, and larger than, said shift shaft aperture extending along the length of said lower portion;

at least one annular seal structured to have its outer surface sealably urged into said seal cavity to form a watertight junction therebetween and to have its inner surface coaxial with said second outer surface and sealably mate against the cylindrical surface of the upper end of the gear shift shaft.

2. A liquid seal as set forth in claim 1, wherein:
said seal cavity is adapted to receive two said annular seals coaxially positioned adjacent to and abutting one another.

3. In a marine stern drive system including a bell housing having adjacent separated exhaust and drive shaft gimbal passageways having an aperture disposed through the partition therebetween for receiving the upper end of a gear shift shaft mounted for rotation within the aperture, the upper end of the gear shift shaft positioned in the gimbal passageway which is designed to remain water free, the remaining portion of the gear shift shaft extending across the exhaust passageway which is designed to have sea water passing there through, the improvement comprising:

a rigid bushing having coaxial upper and lower portions;

said upper portion having a first outer surface structured to be sealably urged into the bell housing aperture to form a watertight junction therebetween thusly positioning said lower portion against the top surface of the exhaust passageway;

said upper portion also having a longitudinal shift shaft aperture generally concentric with and extending along the length of said upper portion structured to supportively receive the upper end of the gear shift shaft for supportive rotation therein;

said lower portion having a second outer surface radially larger than said first outer surface and positioned in the exhaust passageway and a generally concentric seal cavity continuous with, and larger than, said shift shaft aperture extending along the length of said lower portion;

at least one annular seal structure to have its outer surface sealably urged into said seal cavity to form a water tight junction therebetween and to have its inner surface coaxial with said second outer surface and sealably mate against the cylindrical surface of the upper end of the gear shift shaft.

4. A liquid seal as set forth in claim 3, wherein:
said seal cavity is adapted to receive two said annular seal coaxially positioned adjacent to and abutting one another.

* * * * *